(12) United States Patent
Yamasaki

(10) Patent No.: US 6,182,211 B1
(45) Date of Patent: Jan. 30, 2001

(54) CONDITIONAL BRANCH CONTROL METHOD

(75) Inventor: Masayuki Yamasaki, Osaka (JP)

(73) Assignee: Matsushita Electric Industrial Co., Ltd., Osaka (JP)

(*) Notice: Under 35 U.S.C. 154(b), the term of this patent shall be extended for 0 days.

(21) Appl. No.: 09/106,083

(22) Filed: Jun. 29, 1998

(30) Foreign Application Priority Data

Jul. 2, 1997 (JP) .................................................. 9-177070

(51) Int. Cl.$^7$ .............................. G06F 9/42; G06F 9/38; G11C 7/08

(52) U.S. Cl. .................... 712/239; 712/215; 712/238; 714/718

(58) Field of Search ........................ 711/137; 371/21.1; 712/238, 215, 240, 36, 239; 714/718

(56) References Cited

U.S. PATENT DOCUMENTS

| 5,440,704 | 8/1995 | Itomitsu et al. |
|---|---|---|
| 5,928,358 * | 7/1999 | Takayama ............................ 712/239 |
| 5,940,857 * | 8/1995 | Nakanishi et al. ................... 711/137 |
| 6,009,515 * | 12/1999 | Steele, Jr. ............................. 712/244 |
| 6,019,501 * | 2/2000 | Okazaki ................................ 714/718 |

FOREIGN PATENT DOCUMENTS

| 812599 | 7/1982 | (JP) . |
|---|---|---|
| 812599 | 7/1989 | (JP) . |
| 2130634 | 5/1990 | (JP) . |
| 4127237 | 9/1990 | (JP) . |
| 4127237 | 4/1992 | (JP) . |
| 520067 | 1/1993 | (JP) . |
| 5173785 | 7/1993 | (JP) . |

OTHER PUBLICATIONS

Patterson, et al., "Computer Architecture: A Quantitative Approach", pp. 262–267 and English translation of pp. 265 121—p. 266 118 thereof.

Office Action from the Japanese Patent Office dated Mar. 2, 1999 and English translation.

European Search Report dated Feb. 15, 1999.

Antonio Gonzalez, "A Survey of Branch Techniques in Pipelined Processors", Microprocessors and Microprogramming, vol. 36, No. 5, Oct. 1, 1993, pp. 243–257, XP00039707.

Ando, et al., "Speculative Execution and Reducing Branch Penalty on a Superscalar Processor", IEICE Transactions on Electronics, vol. e76c, No. 7, Jul. 1993, pp. 1080–1092, XP000394448.

(List continued on next page.)

Primary Examiner—Daniel H. Pan
Assistant Examiner—Te Fu Chen
(74) Attorney, Agent, or Firm—Stevens, Daivs, Miller & Mosher, L.L.P.

(57) ABSTRACT

In order to effectively reduce branch hazards without a restriction to a structure of a pipeline, the contents of instructions and the like during control of conditional branching in an information processing apparatus which processes an instruction by pipeline processing, before a condition of a conditional branch instruction becomes defined, that is, before a branch judgement is made, pipeline information of a subsequent instruction which is subsequent to the conditional branch instruction is saved so that an instruction beyond a branch is fed to a pipeline in advance. When the condition is met, the instruction beyond the branch is executed as it directly is. When the condition is not met, the saved pipeline information of the subsequent instruction is returned to the pipeline and the subsequent instruction which is subsequent to the conditional branch instruction is executed.

3 Claims, 16 Drawing Sheets

OTHER PUBLICATIONS

Intrater, et al., "Decoded Instruction Cache for Variable Instruction–Length Computers", Proceedings of the Conference of Electrical and Electronics Engineers in Israel, Tel Aviv, Mar. 7–9, 1989, No. Conf. 16, Mar. 7, 1989, pp. 1–4, XP000077585, Institute of Electrical and Electronics Engineers.

Sohie, et al., "A Digital Signal Processor with IEEE Floating–Point Arithmetic", vol. 8, No. 6 + index, Dec. 1, 1988, pp. 49–67, XP000105805.

Office Action from the Japanese Patent Office dated Nov. 17, 1998 and English translation.

Final Rejection from the Japanese Patent Office dated Jun. 8, 1999 and English translation for Patent Application No. 186570.

* cited by examiner

CONDITIONAL BRANCH CONTROL METHOD

BACKGROUND OF THE INVENTION

1. Field of the Invention

The present invention relates to a program control method of controlling a conditional branch in an information processing apparatus which processes an instruction by pipeline processing.

2. Description of the Background Art

In an information processing apparatus which processes an instruction by pipeline processing, while instructions are fed to a pipeline and executed one after another, as the instructions are executed overlapping each other, execution of the instructions is realized at a high speed. However, when a conditional branch instruction requires a branch, since an instruction beyond the branch is fetched at a point when the condition is decided, that is, since a branch address is set to a program counter after a branch judgement is made, a wasteful space, namely, a branch hazard is created in the pipeline.

Such a branch hazard is more likely to occur when a condition is met than when the condition is not met. Branch hazards increase one cycle where there is one instruction fetch stage. Branch hazards increase two cycles where there are two instruction fetch stages. Further, branch hazards increase N cycles where there are N instruction fetch stages (N is an optional positive integer.).

One conventional means for solving the problems is a branch method which uses a so-called delay branch, which requires execution of an instruction located at an address which follows a branch instruction in a delay slot to thereby reduce branch hazards in a pipeline. One example of such a conventional branch method is described in Japanese Patent Application Laid-Open Gazette No. 4-127237, for instance.

According to the conventional method as described above, since an instruction in a delay slot is executed during a cycle of a branch hazard, execution cycles of a branch instruction reduce on appearance. However, in a branch method which utilizes a delay branch described above, since there is a restriction on instructions which can be located in a delay slot, or since it is difficult to appropriately assign instructions to a delay slot if branch hazard have a large number of cycles, or for other reasons, it is not possible to effectively reduce branch hazards in all cases.

SUMMARY OF THE INVENTION

The present invention aims at providing a program control method which effectively reduces branch hazards during control of conditional branching in an information processing apparatus which processes an instruction by pipelines processing, without restricting a structure of a pipeline, the contents of an instruction, etc.

A program control method according to the present invention is characterized in that on a premise that a conditional branch instruction includes an address to which a branch is to be made, pipeline information of a subsequent instruction which is subsequent to the conditional branch instruction is saved before a condition of the conditional branch instruction becomes defined, that is, before a branch judgement is made so that an instruction beyond the branch is fed to a pipeline in advance, and the beyond-the-branch instruction is executed as it directly is when the condition is met, but the saved pipeline information of the subsequent instruction is returned to the pipeline and the subsequent instruction which is subsequent to the conditional branch instruction is executed when the condition is not met. As the pipeline information of the subsequent instruction described above, the address of the subsequent instruction and the instruction code of the subsequent instruction may be used.

In this structure, since the beyond-the-branch instruction is fed to the pipeline in advance before the condition of the conditional branch instruction becomes defined, by the time the condition is met, at lest the first stage of the pipeline processing of the beyond-the-branch instruction is already complete. After the condition is met, the pipeline processing of the beyond-the-branch instruction is continued starting at the second stage or one of the following stages. Hence, it is possible to reduce branch hazards which are associated with execution of the beyond-the-branch instruction more than where the beyond-the-branch instruction is fed to the pipeline after the condition of the conditional branch instruction becomes defined.

Meanwhile, since pipeline information of a subsequent instruction which is subsequent to the conditional branch instruction is saved before the condition of the conditional branch instruction becomes defined, when the condition is not met, as the saved pipeline information of the subsequent instruction which is subsequent to the conditional branch instruction is returned to the pipeline, the subsequent instruction which is subsequent to the conditional branch instruction is executed without increasing branch hazards.

Hence, as a whole, it is possible to reduce branch hazards which are created when the condition is met without increasing branch hazards which are created when the condition is not met, execute a program efficiently, and shorten a processing time.

Further, since the foregoing requires simply to save the pipeline information of the subsequent instruction which is subsequent to the conditional branch instruction and feed the beyond-the-branch instruction to the pipeline in advance before the condition of the conditional branch instruction becomes defined, it is possible to effectively reduce branch hazards without restricting the structure of the pipeline, the contents of instructions, etc.

DESCRIPTION OF THE PREFERRED EMBODIMENTS

First Preferred Embodiment

In the following, a program control method and a program control apparatus for conditional branch processing according to a first preferred embodiment of the present invention will be described with reference to the drawings.

Figure 1:
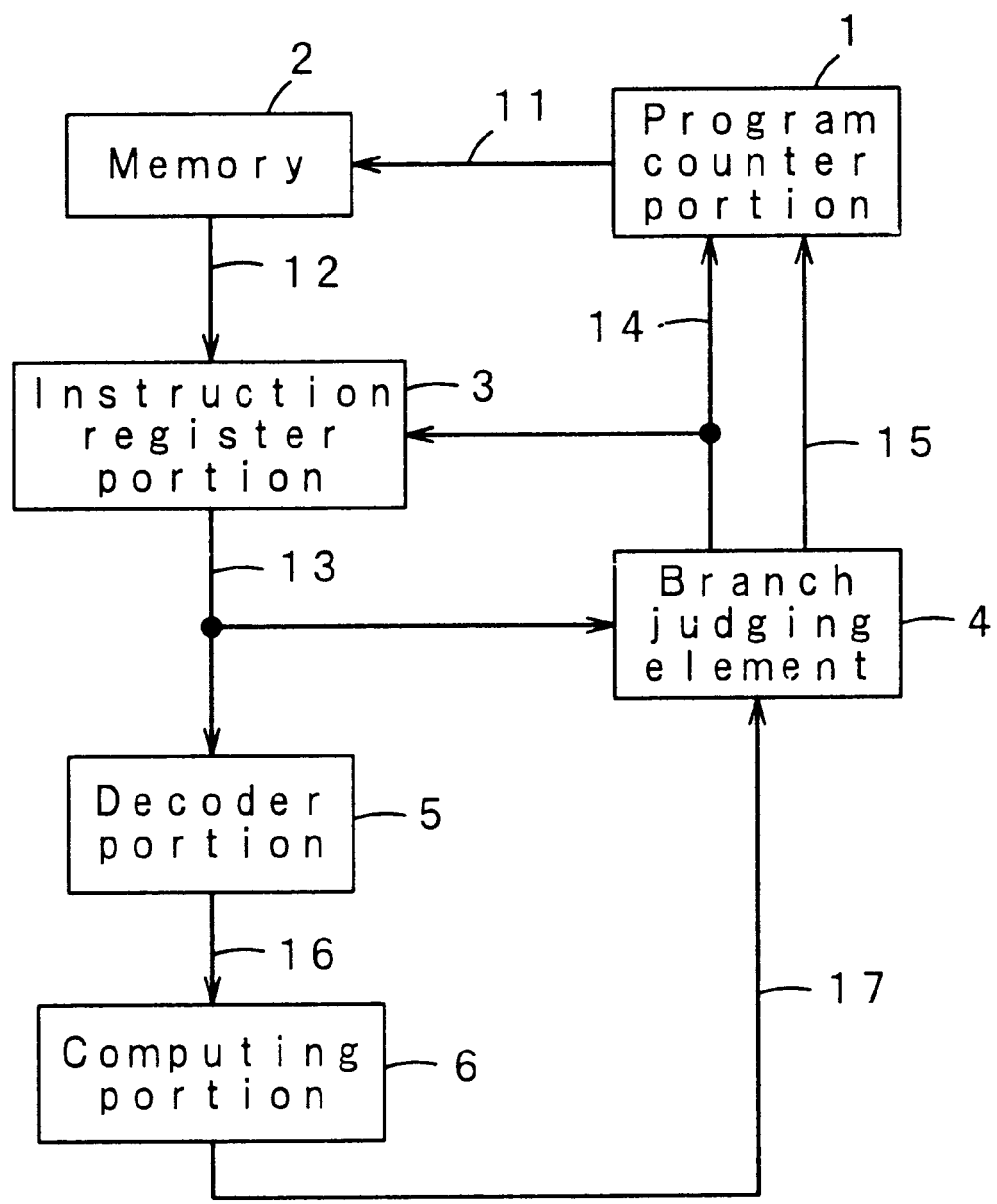
FIG. 1 is a block diagram showing a basic structure of a program control apparatus according to a first, a second, a third and a fourth preferred embodiments of the present invention.

FIG. 1 is a block diagram showing a basic structure of a program control apparatus according to the first preferred embodiment of the present invention. In FIG. 1, a program counter portion 1 serves as address generation means for reading an instruction code. A branch signal 14 which is indicative of a conditional branch instruction and a branch address 15 which corresponds to an address of an instruction beyond a branch are supplied to the program counter portion 1 from a branch judging element 4, and the program counter portion 1 outputs an address 11. A memory 2 serves as instruction storing means for storing an instruction code. The address 11 is supplied to the memory 2 from the program counter portion 1 and the memory 2 outputs a first instruction code 12 which corresponds to the address 11. An instruction register portion 3 serves as instruction control means. Receiving the first instruction code 12 from the memory 2 and the branch signal 14 from the branch judging element 4, the instruction register portion 3 outputs a second instruction code 13. The branch judging element 4 serves as branch judging means. Receiving the second instruction code 13 from the instruction register portion 3 and a condition flag signal 17 from a computing portion 6, the branch judging element 4 judges whether the second instruction code 13 is a conditional branch instruction. When the second instruction code 13 is a conditional branch instruction, the branch judging element 4 outputs the branch signal 14 and the address of the beyond-the-branch instruction which is included in the conditional branch instruction, namely, the branch address 15. A decoder portion 5 serves as means for decoding an instruction. The second instruction code 13 is supplied to the decoder portion 5 from the instruction register portion 3, and the decoder portion 5 outputs a control signal 16. The computing portion 6 serves as computing means. The control signal 16 is supplied to the computing portion 6 from the decoder portion 5, and the computing portion 6 computes and outputs the condition flag signal 17. The structure shown in FIG. 1 is common to structures according to a second through a fourth preferred embodiments which will be described later.

Figure 2:
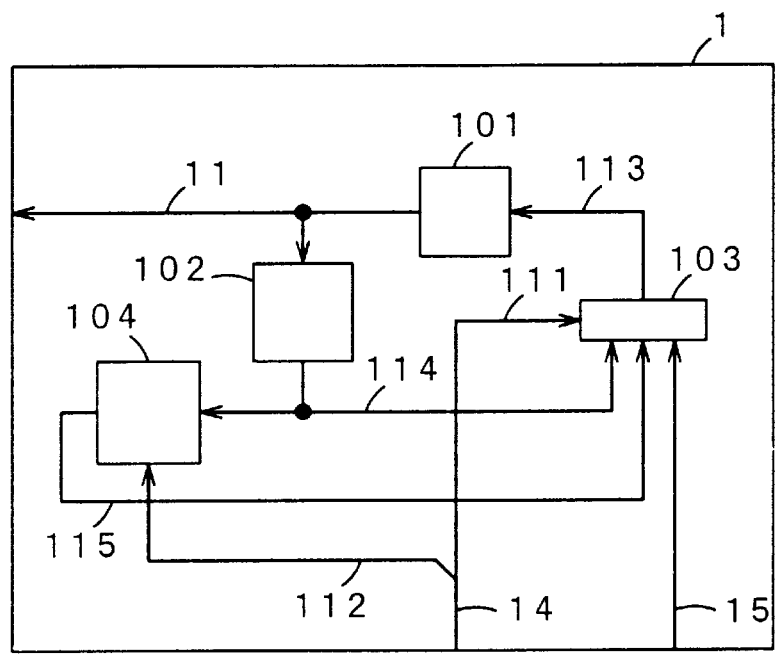
FIG. 2 is a block diagram showing a specific structure of a program counter portion according to the first and the third preferred embodiments of the present invention.

FIG. 2 is a block diagram showing a structure of the program counter portion 1 according to the first preferred embodiment of the present invention. In FIG. 2, a first program counter 101, serving as first address holding means, receives an address selector output 113 and outputs the address 11. An address adder 102, serving as address adding means which increments the address 11, receives the address 11 and outputs an address adder output 114.

A second program counter 104 serves as second address holding means which saves an addresses of a subsequent instruction which is subsequent to the conditional branch instruction, which is one of pipeline information of the subsequent instruction which is subsequent to the conditional branch instruction, before a condition of the conditional branch instruction becomes defined. The address adder output 114 and a second program counter branch signal 112 are supplied to the second program counter 104, and the second program counter 104 outputs a second program counter output 115. The address adder output 114 corresponds to the saved address of a subsequent instruction. The second program counter output 115 corresponds to the address of a subsequent instruction which is returned to a pipeline.

An address selector 103, serving as address selection means, receives the branch address 15, the address adder output 114, the second program counter output 115 and an address selector branch signal 111, and outputs the address selector output 113. When the address selector branch signal 111 is a conditional branch instruction, the address selector 103 selects the branch address 15 as the next address. When the address selector branch signal 111 is not a conditional branch instruction, the address selector 103 selects the address adder output 114 as the next address. When the conditional branch instruction is not established, at an execution stage for executing the conditional branch instruction, the address selector 103 selects the second program counter output 115 as the next address. The structure shown in FIG. 2 is common to a structure according to a third preferred embodiment which will be described later.

When there is a conditional branch instruction, judging that a condition is not met when the condition flag signal 17 is "0," the branch judging element 4 outputs the address selector branch signal 111 and a first instruction register branch signal 311 at the execution stage.

Figure 4:
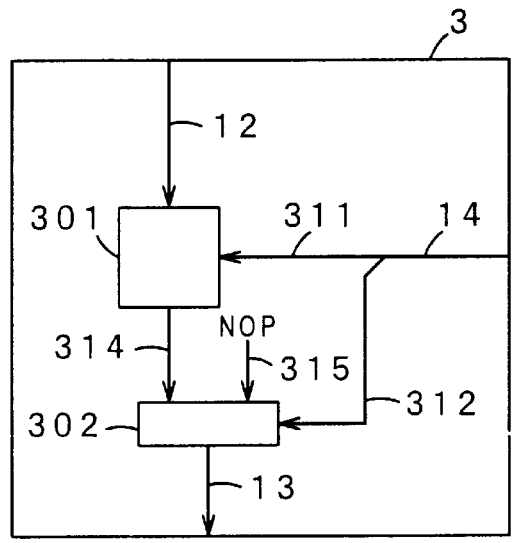
FIG. 4 is a block diagram showing a specific structure of an instruction register portion according to the first and the second preferred embodiments of the present invention.

FIG. 4 is a block diagram showing a structure of the instruction register portion 3 according to the first preferred embodiment of the present invention. In FIG. 4, a first instruction register 301 serves as first instruction holding means. Receiving the first instruction code 12 and the first instruction register branch signal 311, the first instruction register 301 outputs an instruction register output 314. In this case, the first instruction register 301 normally stores the first instruction code 12 while updating the first instruction code 12 every cycle. When the first instruction register branch signal 311 is received, the first instruction register 301 holds an instruction code of a preceding cycle.

An instruction selector 302 serves as instruction selection means. The instruction selector 302 receives the instruction register output 314, an NOR code 315 and an instruction selector branch signal 312, and outputs the second instruction code 13. In this case, while the instruction selector 302 normally selects the instruction register output 314, when the instruction selector branch signal 312 is received, the instruction selector 302 selects the NOP code.

The branch signal 14 is formed by the address selector branch signal 111, the second program counter branch signal 112, the first instruction register branch signal 311 and the instruction selector branch signal 312. The structure shown in FIG. 4 is common to a structure according to the second preferred embodiment which will be described later.

Now, operations of the program control apparatus having such a structure described above will be described with reference to FIGS. 7 and 8.

Figure 7:
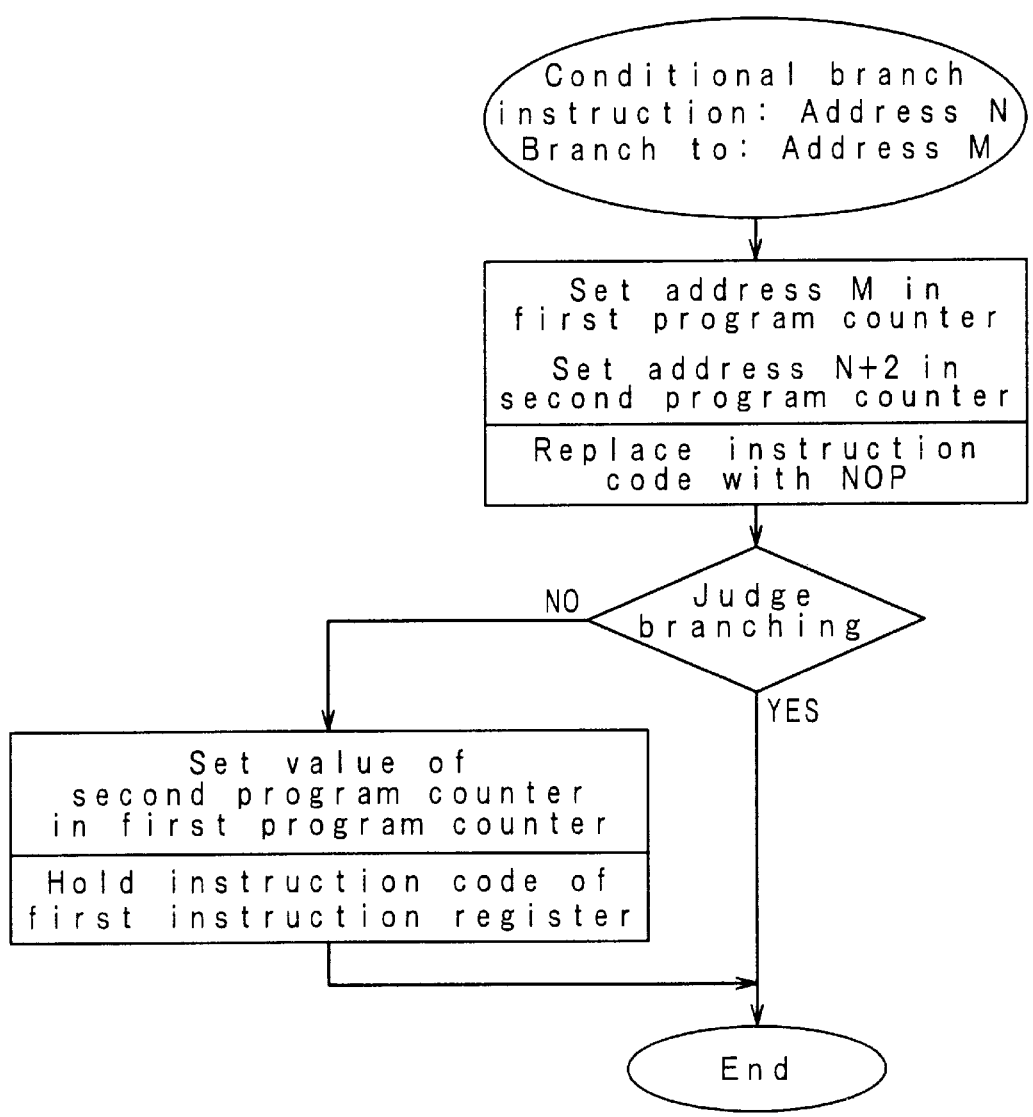
FIG. 7 is a flowchart which shows a flow of control of conditional branching in a three-stage pipeline according to the first preferred embodiment of the present invention.
Figure 8:
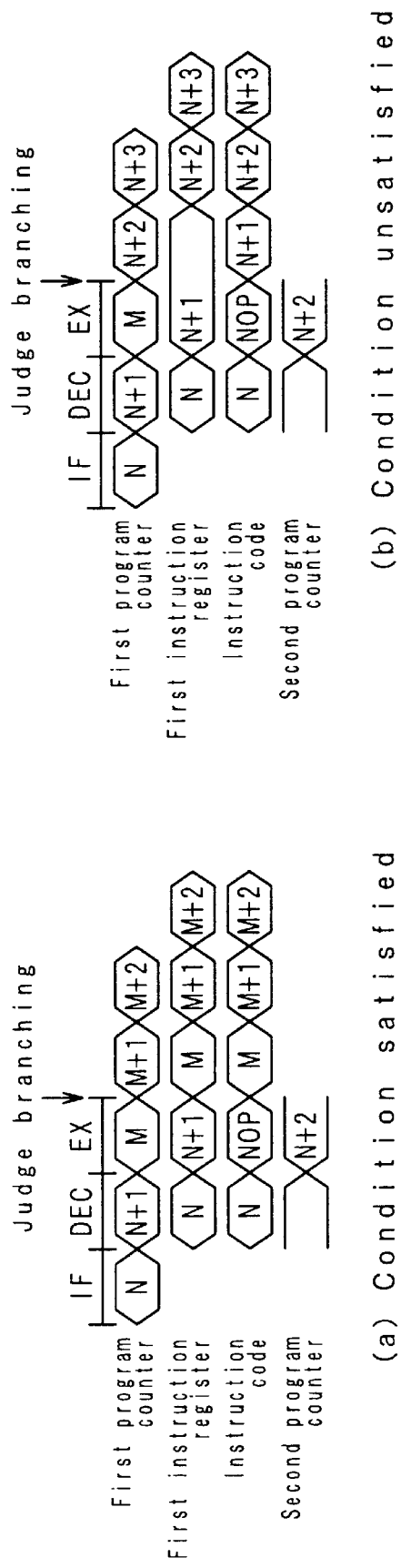
FIG. 8 is a timing chart which shows timing of conditional branching in a three-stage pipeline according to the first preferred embodiment of the present invention.

FIG. 7 shows a control flow of execution of a conditional branch instruction for a three-stage pipeline (of an instruction fetch stage IF, an instruction decode stage DEC and an instruction execution stage EX). In this case, an address of a conditional branch instruction is an address N, and an address of an instruction beyond a branch is an address M. FIG. 8 is a corresponding timing chart. The section (a) corresponds to a case where a condition is met, while the section (b) corresponds to a case where a condition is not met. In the following, an operation at each stage of a pipeline will be described. The instruction fetch stage will not be described.

(1) Instruction Decode Stage for Conditional Branch Instruction

The branch judging element 4 decodes the second instruction code 13. Judging that the second instruction code 13 is a conditional branch instruction, the branch judging element 4 outputs the branch signal 14 and the branch address 15.

(2) Execution Stage for Conditional Branch Instruction.

In accordance with the second program counter branch signal 112, the program counter portion 1 sets an address (N+2) of an instruction two instructions after the conditional branch instruction to the second program counter 104. As a result, the address (N+2) of the instruction two instructions after the conditional branch instruction is saved.

The address selector 103 selector branch signal 111, whereby the branch address 15 (M) is set in the first program counter 101 and the address 11 becomes an address M. As a result, before a time point that a branch judgement is made (which is the end of the execution stage for executing the conditional branch instruction), an instruction beyond a branch is fed to the pipeline in advance.

The instruction selector 302 selects the NOP code (i.e., No Operation code) 315 in accordance with the instruction selector branch signal 312, whereby the second instruction code 13 becomes an NOP instruction.

Where Condition Is Met:

(3) Next Stage Following Execution Stage for Conditional Branch Instruction

The branch signal 14 is freed and the apparatus returns to the normal operations, so that the second instruction code 13 becomes an instruction at the address M. As a result, the instruction at the address M and the following instructions are executed in a sequence after the conditional branch instruction which is located at the address N, although with one cycle of a branch hazard interposed.

Where Condition Is Not Met:

(3) Next Stage Following Execution Stage for Conditional Branch Instruction

The address selector 103 selects the second program counter output 115 in accordance with the address selector branch signal 111, whereby the value registered in the second program counter 104 is set to the first program counter 101 and the address 11 becomes the address N+2. As a result, the saved address of the subsequent instruction is returned to the pipeline. Further, the first instruction register 301 holds an instruction at an address N+1 in accordance with the first instruction register branch signal 311, so that the second instruction code 13 becomes the instruction at the address N+1. As a result, the instruction at the address N+1 and the following instruction are executed in sequence after the conditional branch instruction which is located at the address N, although with one cycle of a branch hazard interposed.

Figure 17:
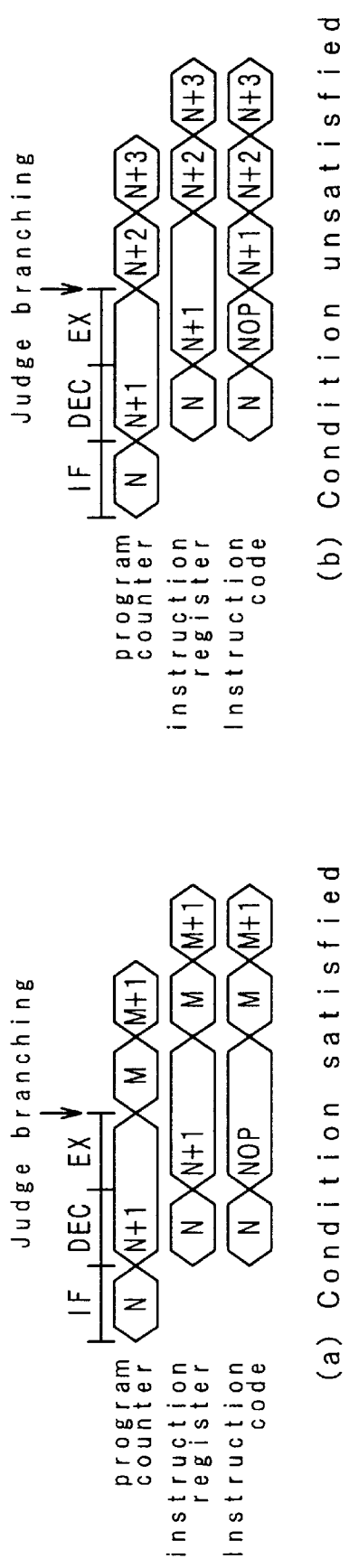
FIG. 17 is a timing chart which shows timing of conditional branching in a conventional three-stage pipeline.

FIG. 17 is a time chart for a conventional example where a conditional branch instruction is executed in a three-stage pipeline (of an instruction fetch stage IF, an instruction decode stage DEC and an instruction execution stage EX). The section (a) corresponds to a case where a condition is met, while the section (b) corresponds to a case where a condition is not met. In this case, an address of a conditional branch instruction is an address N, and an address of an instruction beyond a branch is an address M.

Comparing FIG. 8 with FIG 17, it is understand that branch hazards are reduced one cycle in the case where the condition is met.

The program control method described above which is shown in FIGS. 1, 2, 4, 7 and 8 is summarized as follows. That is, an instruction code at the address 11, which is outputted from the program counter portion 1, is retrieved from the memory 2 to the instruction register portion 3 and a corresponding instruction is executed. Therefore, when conditional branching for pipelining the instruction is to be controlled, before a condition of a conditional branch instruction becomes defined, the program counter portion 1 saves an address of an instruction two instruction after the conditional branch instruction, the branch address 15 is set to the program counter portion 1, and the instruction register portion 3 replaces the instruction code with an NOP instruction code. When the condition is met, the instructions executed as it directly is. When the condition is not met, the saved address of the instruction two instructions after the conditional branch instruction is set to the program counter portion 1, the instruction register portion 3 holds an instruction code of an instruction one instruction after the conditional branch instruction, and the instruction is executed.

Meanwhile, the program control apparatus described above which is shown in FIGS. 1, 2, 4, 7 and 8 has the following structure. That is, aiming at controlling conditional branching for pipelining an instruction, the apparatus comprises the program counter portion 1 which receives the branch address 15 and the branch signal 14 to generate the address 11, the memory 2 which stores or outputs the first instruction code 12 in accordance with the address 11, the instruction register portion 3 which receives the first instruction code 12 and the branch signal 14 and outputs the second instruction code 13, and the branch judging element 4 which decodes the second instruction code 13, decides a branch and outputs the branch signal 14 and the branch address 15.

In this case, the program counter portion 1 is formed by the first and the second program counters 101 and 104, the address selector 103, and the address adder 102. The first program counter 101 receives the address selector output 113 and outputs the address 11. The address selector 103 receives the branch address 15, the address adder output 114 and the second program counter output 115, and selects and outputs one of the branch address 15, the address adder output 114 and the second program counter output 115 in response to the branch signal 14. The address adder 102 increments the address 11. The second program counter 104 receives the address adder output 114, and holds the address adder output 114 in response to the branch signal 14.

On the other hand, the instruction register portion 3 is formed by the first instruction register 301 and the instruction selector 302. The first instruction register 301 receives the first instruction code 12, and holds the first instruction code 12 in response to the branch signal 14. The instruction selector 302 receives the first instruction register output 314 and the NOP code 315, and selects either one of the first instruction register output 314 and the NOP code 315 and outputs the first instruction register output 314 or the NOP code 315 as the second instruction code 13 in response to the branch signal 14.

In this instruction, before a condition of a conditional branch instruction becomes defined, an address two instructions after the conditional branch instruction is saved in the second program counter 104, the branch address 15 is set to the program counter 101, and the instruction selector 302 selects the NOP code 315. When the condition is met, an instruction is executed as it directly is. When the condition is not met, the address saved in the second program counter 104 is set to the program counter 101 and the first instruction register 301 holds an instruction code of an instruction one instruction after the conditional branch instruction under control, so that branch hazards are reduced one cycle which are created when the condition of the conditional branch instruction is met.

As described above, in accordance with the preferred embodiment, since the branch address 15 is set to the first program counter 101 and consequently fed to a pipeline in advance before a condition of the conditional branch instruction becomes defined, by the time the condition is met, the first stage, i.e., the instruction fetch stage of pipeline processing of an instruction beyond the branch is already complete. After the condition is met, the pipeline processing of the beyond-the-branch instruction is continued starting at the second stage, namely the instruction decode stage, and therefore, branch hazards associated with execution of the beyond-the-branch instruction are reduced compared with where the beyond-the-branch instruction is fed to the pipeline after the condition of the conditional branch instruction becomes defined.

Meanwhile, an address of a subsequent instruction which is subsequent to the conditional branch instruction is stored in the second program counter 104 before the condition of the conditional branch instruction becomes defined, so that the address of the subsequent instruction which is subsequent to the conditional branch instruction is saved. Hence, when the condition is not met, the saved address of the subsequent instruction which is subsequent to the conditional branch instruction is set to the first program counter 101 and consequently returned to the pipeline, and therefore, the subsequently instruction which is subsequent to the conditional branch instruction is executed without increasing branch hazards. It then follows that as a whole, it is possible to reduce branch hazards which are created when the condition is met without increasing branch hazards which are created when the condition is not met, execute a program efficiently, and shorten a processing time.

Further, since the foregoing requires simply to save the address of the subsequent instruction which is subsequent to the conditional branch instruction and feed the branch address 15 to the pipeline in advance before the condition of the conditional branch instruction becomes defined, it is possible to effectively reduce branch hazards without restricting the structure of the pipeline, the contents of instructions, etc.

Although the preferred embodiment described above is related to a three-stage pipeline, a similar effect is obtained with a multi-stage pipeline which comprises four or more stages including two or more instruction decode stages.

Second Preferred Embodiment

In the following, a program control method and a program control apparatus for conditional branch processing according to a second preferred embodiment of the present invention will be described with reference to the drawings.

Figure 3:
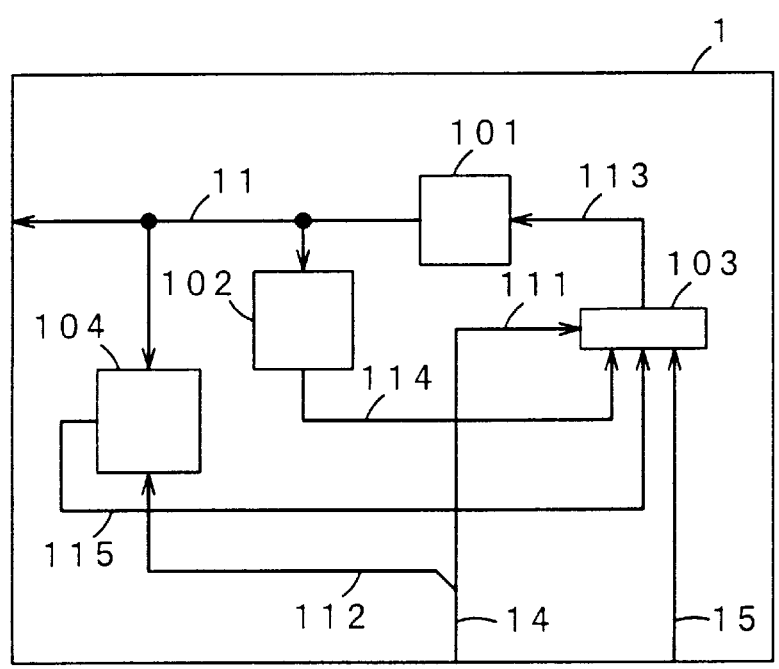
FIG. 3 is a block diagram showing a specific structure of a program counter portion according to the second and the fourth preferred embodiments of the present invention.

FIG. 3 is a block diagram showing a structure of the program counter portion 1 according to the second preferred embodiment of the present invention. A difference from FIG. 2 is that an input to the second program counter 104 is changed to the address 11 from the address adder output 114. In FIG. 3, elements which have the same function as those of the elements which are shown in FIG. 2 will be denoted at the same reference symbols as those used in FIG. 2, and a detailed description on those elements will be simply omitted. The structure shown in FIG. 3 is common to a structure according to a fourth preferred embodiment which will be described later.

According to the second preferred embodiment, the structure of the program counter portion 1 in the basic structure which is shown in FIG. 1 is as shown in FIG. 3, and the structure of the instruction register portion 3 is as shown in FIG. 4. The branch signal 14 is formed by the address selector branch signal 111, the second program counter branch signal 112, the first instruction register branch signal 311 and the instruction selector branch signal 312.

Now, operations of the program control apparatus which has such a structure above will be described with reference to FIGS. 9 and 10.

Figure 9:
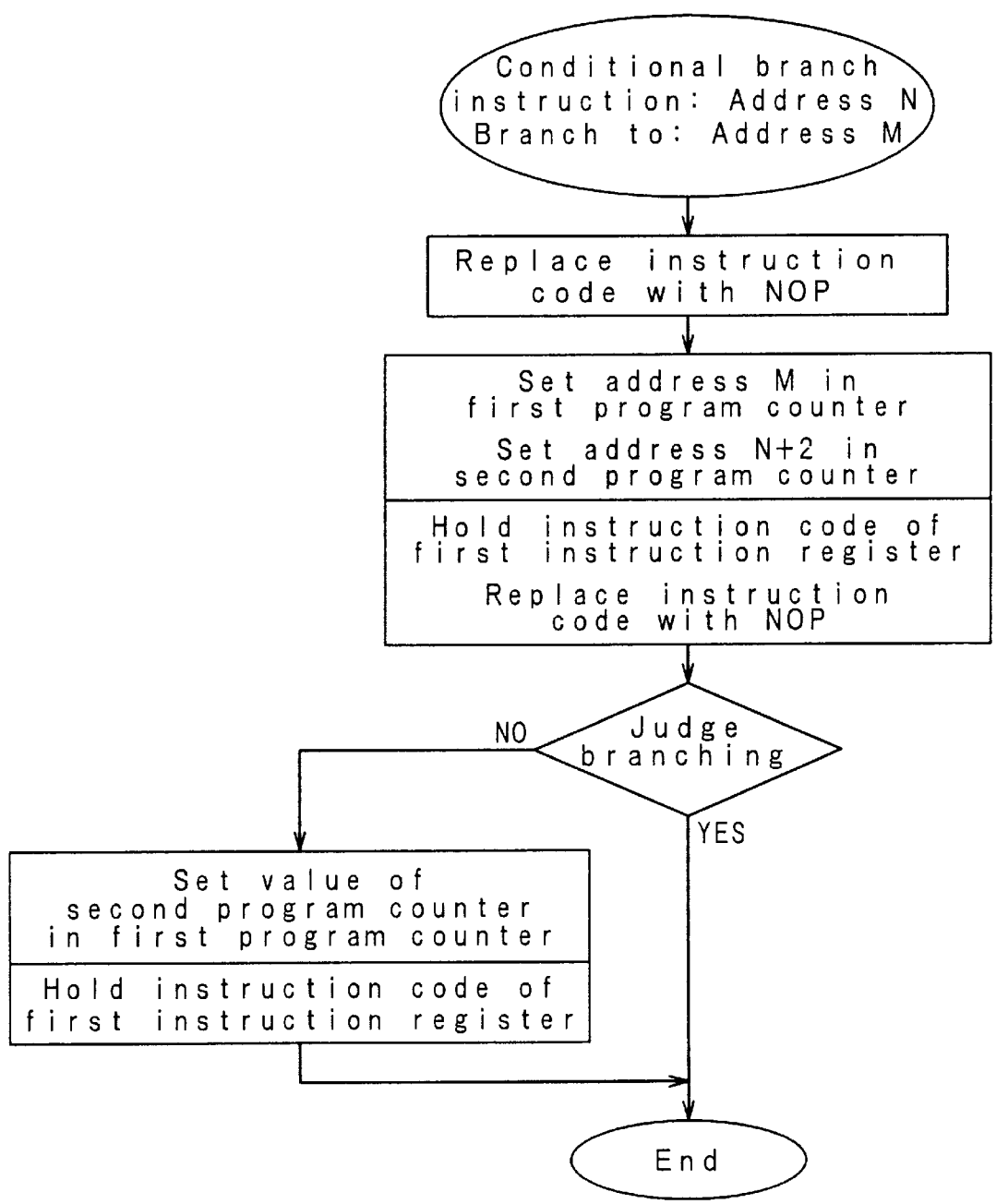
FIG. 9 is a flowchart which shows a flow of control of conditional branching in a four-stage pipeline according to the second preferred embodiment of the present invention.
Figure 10:
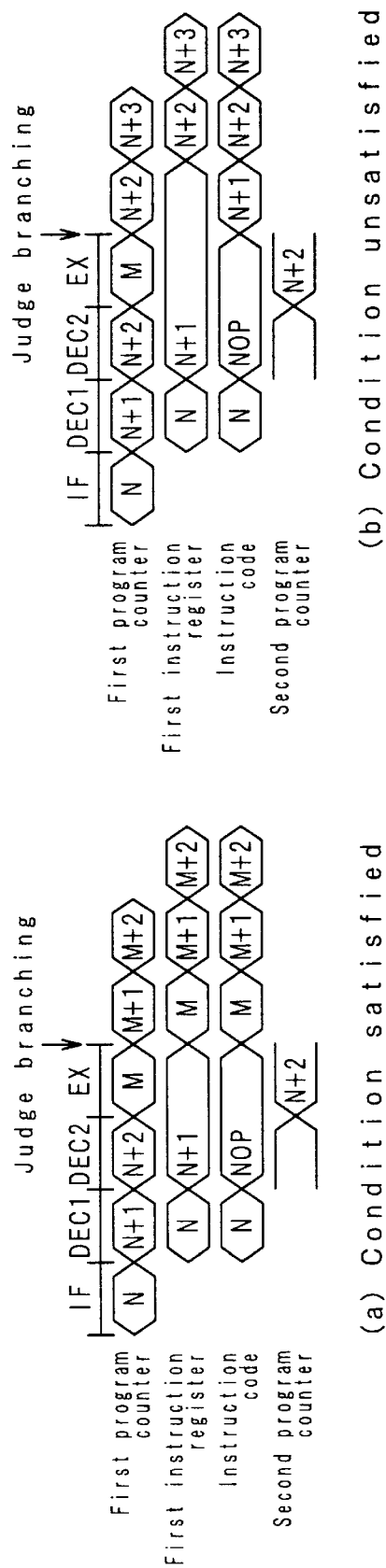
FIG. 10 is a timing chart which shows timing of conditional branching in a four-stage pipeline according to the second preferred embodiment of the present invention.

FIG. 9 shows a control flow of execution of a conditional branch instruction for a four-stage pipeline (of an instruction fetch stage IF, a first instruction decode stage DEC1, a second instruction decode stage DEC2 and an instruction execution stage EX). In this case, an address of a conditional branch instruction is an address N, and an address of an instruction beyond a branch is an address M. FIG. 10 is a corresponding timing chart. The section(a) corresponds to a case where a condition is met, while the section (b) corresponds to a case where a condition is not met. In the following, an operation at each stage of a pipeline will be described. The instruction fetch stage and the first instruction decode stage will not be described.

(1) Second Instruction Decode Stage for Conditional Branch Instruction

The branch judging element 4 decodes the second instruction code 13. Judging that the second instruction code 13 is a conditional branch instruction, the branch judging element 4 outputs the branch signal 14 and the branch address 15.

The instruction selector 302 selects the NOP code (i.e., No Operation code) 315 in accordance with the instruction selector branch signal 312, whereby the second instruction code 13 becomes an NOP instruction.

(2) Execution Stage for Conditional Branch Instruction

In accordance with the second program counter branch signal 112, the program counter portion 1 sets an address N+2) of an instruction two instructions after the conditional branch instruction to the second program counter 104. This saves the address (N+2) of the instruction two instructions after the conditional branch instruction.

The address selector 103 selects the branch address 15 in accordance with the address selector branch signal 111, whereby the branch address 15 is set in the first program counter 101 and the address 11 becomes the address M. As a result, before a time point that a branch judgement is made (which is the end of the execution stage for executing the conditional branch instruction), an instruction beyond a branch is fed to the pipeline in advance.

The first instruction register 301 holds an instruction at an address N+1 in accordance with the first instruction register branch signal 311, so that the second instruction code 13 becomes the instruction at the address N+1.

The instruction selector 302 selects the NOP code (i.e., No Operation code) 315 in accordance with the instruction selector branch signal 312, whereby the second instruction code 13 becomes an NOP instruction.

Where Condition Is Met:

(3) Next Stage Following Execution Stage for Conditional Branch Instruction

The branch signal 14 is freed and the apparatus returns to the normal operations, so that the second instruction code 13 becomes an instruction at the address M.

As a result, the instruction at the address M and the following instructions are executed in sequence after the conditional branch instruction which is located at the address N, although with two cycles of branch hazards interposed.

Where Condition In Not Met:

(3) Next Stage Following Execution Stage for

Conditional Branch Instruction

The address selector 103 selects the second program counter output 115 in accordance with the address selector branch signal 111, whereby the value registered in the second program counter 104 is set to the first program counter 101 and the address 11 becomes the address N+2. As a result, the saved address of the subsequent instruction is returned to the pipeline. Further, the first instruction register 301 holds the instruction at the address N+1 in accordance with the first instruction register branch signal 311, so that the second instruction code 13 becomes the instruction at the address N+1.

As a result, the instruction at the address N+1 and the following instructions are executed in sequence after the conditional branch instruction which is located at the address N, although with two cycles of branch hazards interposed.

The program control method described above which is shown in FIGS. 1, 3, 4, 9 and 10 is summarized as follows. That is, an instruction code at the address 11, which is outputted from the program counter portion 1, is retrieved from the memory 2 to the instruction register portion 3 and a corresponding instruction is executed. Therefore, when conditional branching for pipelining the instruction is to be controlled, before a condition of a conditional branch instruction becomes defined, the instruction register portion 3 replaces the instruction code with the NOP instruction code, the program counter portion 1 thereafter saves an address of an instruction two instructions after the conditional branch instruction, the branch address 15 is set to the program counter portion 1, and the instruction register portion 3 replaces the instruction code with an NOP instruction code. When the condition is met, the instruction is executed as it directly is. When the condition is not met, the saved address of the instruction two instructions after the conditional branch instruction is set to the program counter portion 1, the instruction register portion 3 holds an instruction code of an instruction one instruction after the conditional branch instruction, and the instruction is executed.

Meanwhile, the program control apparatus described above which is shown in FIGS. 1, 3, 4, 9 and 10 has the following structure. That is, aiming at controlling conditional branching for pipelining an instruction, the apparatus comprises the program counter portion 1 which receives the branch address 15 and the branch signal 14 to generate the address 11, the memory 2 which stores or outputs the first instruction code 12 in accordance with the address 11, the instruction register portion 3 which receives the first instruction code 12 and the branch signal 14 and outputs the second instruction code 13, and the branch judging element 4 which decodes the second instruction code 13, decides a branch and outputs the branch signal 14 and the branch address 15.

In this case, the program counter portion 1 is formed by the first and the second program counters 101 and 104, the address selector 103, and the address adder 102. The first program counter 101 receives the address selector output 113 and outputs the address 11. The address selector 103 receives the branch address 15, the address adder output 114 and the second program counter output 115, and selects and outputs one of the branch address 15, the address adder output 114 and the second program counter output 115 in response to the branch signal 14. The address adder 102 increments the address 11. The second program counter 104 receives the address 11, and holds the address 11 in response to the branch signal 14.

On the other hand, the instruction register portion 3 is formed by the first instruction register 301 and the instruction selector 302. The first instruction register 301 receives the first instruction code 12, and holds the first instruction code 12 in response to the branch signal 14. The instruction selector 302 receives the first instruction register output 314 and the NOP code 315, and selects either one of the first instruction register output 314 and the NOP code 315 and outputs the first instruction register output 314 or the NOP code 315 as the second instruction code 13 in response to the branch signal 14.

In this structure, before a condition of a conditional branch instruction becomes defined, the instruction selector 302 selects the NOP code 315, an address two instructions after the conditional branch instruction is saved in the second program counter 104, the branch address 15 is set to the program counter 101, and the instruction selector 302 then selects the NOP code 315. When the condition is met, an instruction is executed as it directly is. When the condition is not met, the address saved in the second program counter 104 is set to the program counter 101 and the first instruction register 302 holds an instruction code of an instruction one instruction after the conditional branch instruction under control, so that branch hazards are reduced one cycle which are created when the condition of the conditional branch instruction is met.

As described above, the second preferred embodiment ensure a similar effect to that according to the first preferred embodiment. Further, it is possible to provide one more stage for a branch judgement according to the second preferred embodiment than in the first preferred embodiment.

Although the second preferred embodiment described above is related to a four-stage pipeline, a similar effect is obtained with a multi-stage pipeline which comprises five or more stages including three or more instruction decode stages.

In addition, a four-stage pipeline can be realized with the first preferred embodiment as well, if the structure described immediately above is modified in such a manner that the address (N+2) two instructions after the conditional branch instruction is set to the second program counter 104 at the second instruction decode stage instead of at the execution stage. More precisely, a difference from the first preferred embodiment lies in the timing of saving the subsequent instruction subsequent to the conditional branch instruction. With respect to saving of the address N+2, between where the address 11 is saved and where an output from the address adder 102 is saved, the timing of saving shifts one cycle.

Third Preferred Embodiment

In the following, a program control method and a program control apparatus for conditional branch processing according to a third preferred embodiment of the present invention will be described with reference to the drawings.

Figure 5:
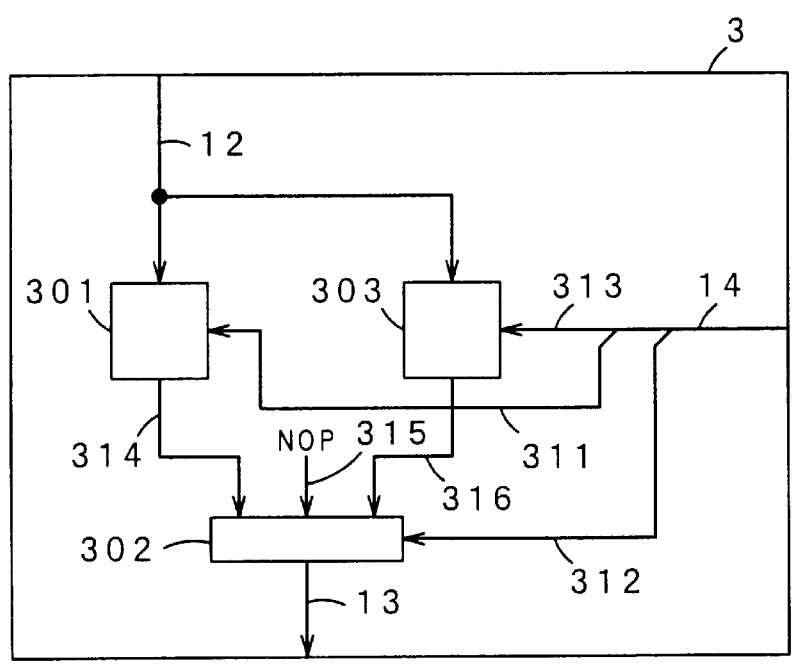
FIG. 5 is a block diagram showing a specific structure of an instruction register portion according to the third preferred embodiment of the present invention.

FIG. 5 is a block diagram showing a structure of the instruction register portion 3 according to the third preferred embodiment of the present invention. A difference from FIG. 4 is that the third preferred embodiment requires a second instruction register 303 which serves as second instruction holding means which receives the first instruction code 12 and a second instruction register branch signal 313 and outputs a second instruction register output 316 and that the instruction selector 302 selects the first instruction register output 314 or the second instruction register output 316 in accordance with the instruction selector branch signal 312. The second instruction register 303 has a function of saving an instruction code of a subsequent instruction which is subsequent to a conditional branch instruction. The instruction selector 302, selecting the second instruction register output 316 when a condition is not met, exhibits a function of returning the saved instruction code of the subsequent instruction to a pipeline. In FIG. 5, elements which have the same function as those of the elements which are shown in FIG. 4 will be denoted at the same reference symbols as those used in FIG. 4, and a detailed description on those elements will be simply omitted.

According to the third preferred embodiment, the structure of the program counter portion 1 in the basic structure which is shown in FIG. 1 is as shown in FIG. 2, and the structure of the instruction register portion 3 is as shown in FIG. 5. The branch signal 14 is formed by the address selector branch signal 111, the second program counter branch signal 112, the first instruction register branch signal 311, the instruction selector branch signal 312 and the second instruction register branch signal 313.

Now, operations of the program control apparatus which has such a structure above will be described with reference to FIGS. 11 and 12.

Figure 11:
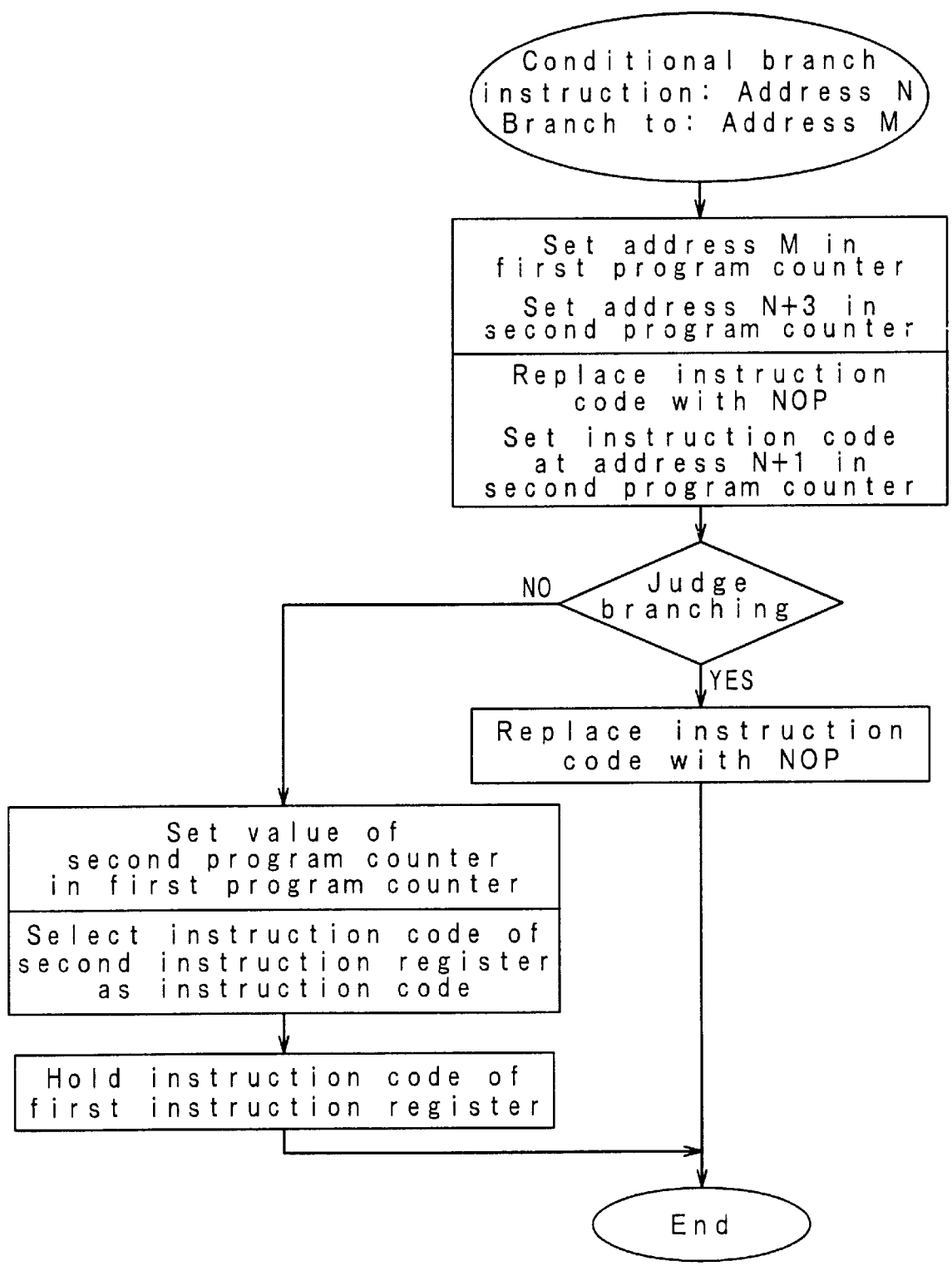
FIG. 11 is a flowchart which shows a flow of control of conditional branching in a four-stage pipeline which includes two stages for fetching instructions according to the third preferred embodiment of the present invention.

FIG. 11 shows a control flow of execution of a conditional branch instruction for a four-stage pipeline (of a first instruction fetch stage IF1, a second instruction fetch stage IF2, an instruction decode stage DEC, and an instructional execution stage EX) which includes two stages for fetching instructions. In this case, an address of a conditional branch instruction is an address N, and an address of an instruction beyond a branch is an address M. FIG. 12 is a corresponding timing chart. The section (a) corresponds to a case where a condition is met, while the section (b) corresponds to a case where a condition is not met. In the following, an operation at each stage of a pipeline will be described. The first instruction fetch stage and the second instruction fetch stage will not be described.

(1) Instruction Decode Stage for Conditional Branch Instruction

The branch judging element 4 decodes the second instruction code 13. Judging that the second instruction code 13 is a conditional branch instruction, the branch judging element 4 outputs the branch signal 14 and the branch address 15.

(2) Execution Stage for Conditional Branch Instruction

In accordance with the second program counter branch signal 112, an address (N+3) of an instruction three instructions after the conditional branch instruction is set to the second program counter 104. This saves the address (N+3) of the instruction three instructions after the conditional branch instruction.

The address selector 103 selects the branch address 15 in accordance with the address selector branch signal 111, whereby the branch address 15 is set in the first program counter 101 and the address 11 becomes the address M. As a result, before a time point that a branch judgment is made (which is the end of the execution stage for executing the conditional branch instruction), an instruction beyond a branch is fed to the pipeline in advance.

In accordance with the second instruction register branch signal 313, an instruction code (N+1) of an instruction one instruction after the conditional branch instruction is set to the second instruction register 303. This saves the instruction code (N+1) of the instruction one instruction after the conditional branch instruction.

The instruction selector 302 selects the NOP code (i.e., No Operation code) 315 in accordance with the instruction selector branch signal 312, whereby the second instruction code 13 becomes an NOP instruction.

Where Condition Is Met:

(3) Next Stage Following Execution Stage for Conditional Branch Instruction

The instruction selector 302 selects the NOP code (i.e., No Operation code) 315 in accordance with the instruction selector branch signal 312, whereby the second instruction code 13 becomes an NOP instruction.

(4) Second Next Stage Following Execution Stage for Conditional Branch Instruction The branch signal 14 is freed and the apparatus returns to the normal operations, so that the second instruction code 13 becomes an instruction at the address M. As a result, the instruction at the address M and the following instructions are executed in sequence after the conditional branch instruction which is located at the address N, although with two cycles of branch hazards interposed.

Where Condition Is Not Met:

(3) Next Stage Following Execution Stage for Conditional Branch Instruction

The address selector 103 selects the second program counter output 115 in accordance with the address selector branch signal 111, whereby the value registered in the second program counter 104 is set to the first program counter 101 and the address 11 becomes the address N+3. As a result, the saved address of the subsequent instruction is returned to the pipeline.

Meanwhile, the instruction selector 302 selects the second instruction register output 316 in accordance with the instruction selector branch signal 312, whereby the second instruction code 13 becomes an instruction at the address N+1. As a result, the saved instruction code of the subsequent instruction is returned to the pipeline.

(4) Second Next Stage Following Execution Stage for Conditional Branch Instruction The first instruction register 301 holds the instruction at the address N+2in accordance with the first instruction register branch signal 311, so that the second instruction code 13 becomes the instruction at the address N+2.

As a result, the instruction at the address N+1 and the following instructions are executed in sequence after the conditional branch instruction which is located at the address N, although with one cycle of a branch hazard interposed.

Figure 18:
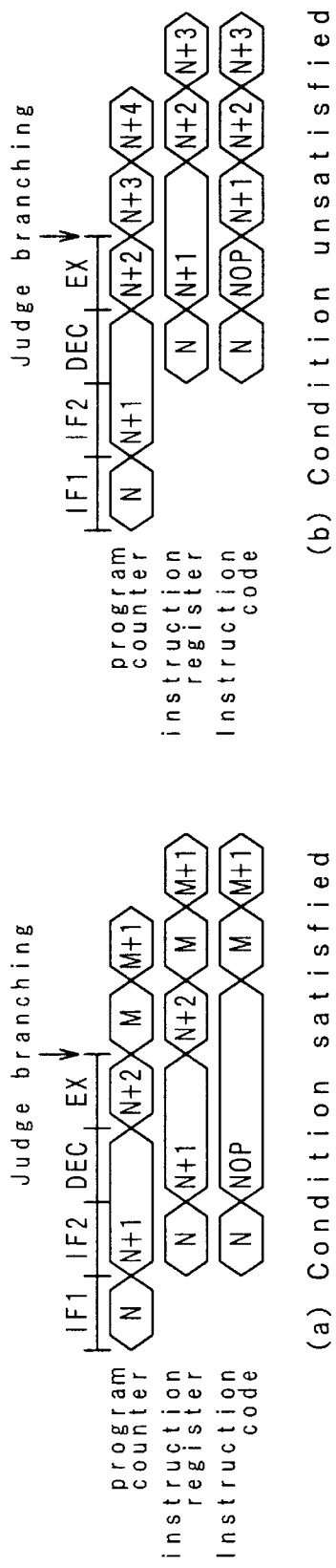
FIG. 18 is a timing chart which shows timing of conditional branching in a conventional four-stage pipeline which includes two stages for fetching instructions.

FIG. 18 is a time chart for a conventional example where a conditional branch instruction is executed in a four-stage pipeline (of a first instruction fetch stage IF1, a second instruction fetch stage IF2, an instruction decode stage DEC and an instruction execution stage EX). The section (a) corresponds to a case where a condition is met, while the section (b) corresponds to a case where a condition is not met. In this case, an address of a conditional branch instruction is an address N, and an address of an instruction beyond a branch is an address M.

Figure 12:
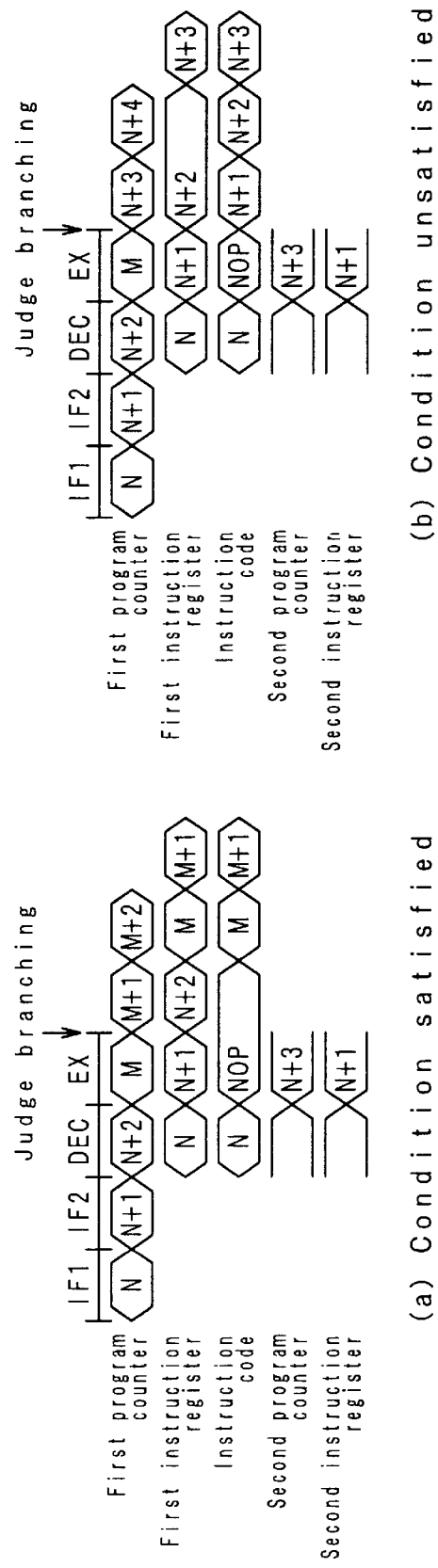
FIG. 12 is a timing chart which sows timing of conditional branching in a four-stage pipeline which includes two stages for fetching instructions according to the third preferred embodiment of the present invention.

Comparing FIG. 12 with FIG. 18, it is understood that branch hazards are reduced one cycle in the case where the condition is met.

Next, operations of a five-stage pipeline will be described with reference to FIGS. 13 and 14.

Figure 13:
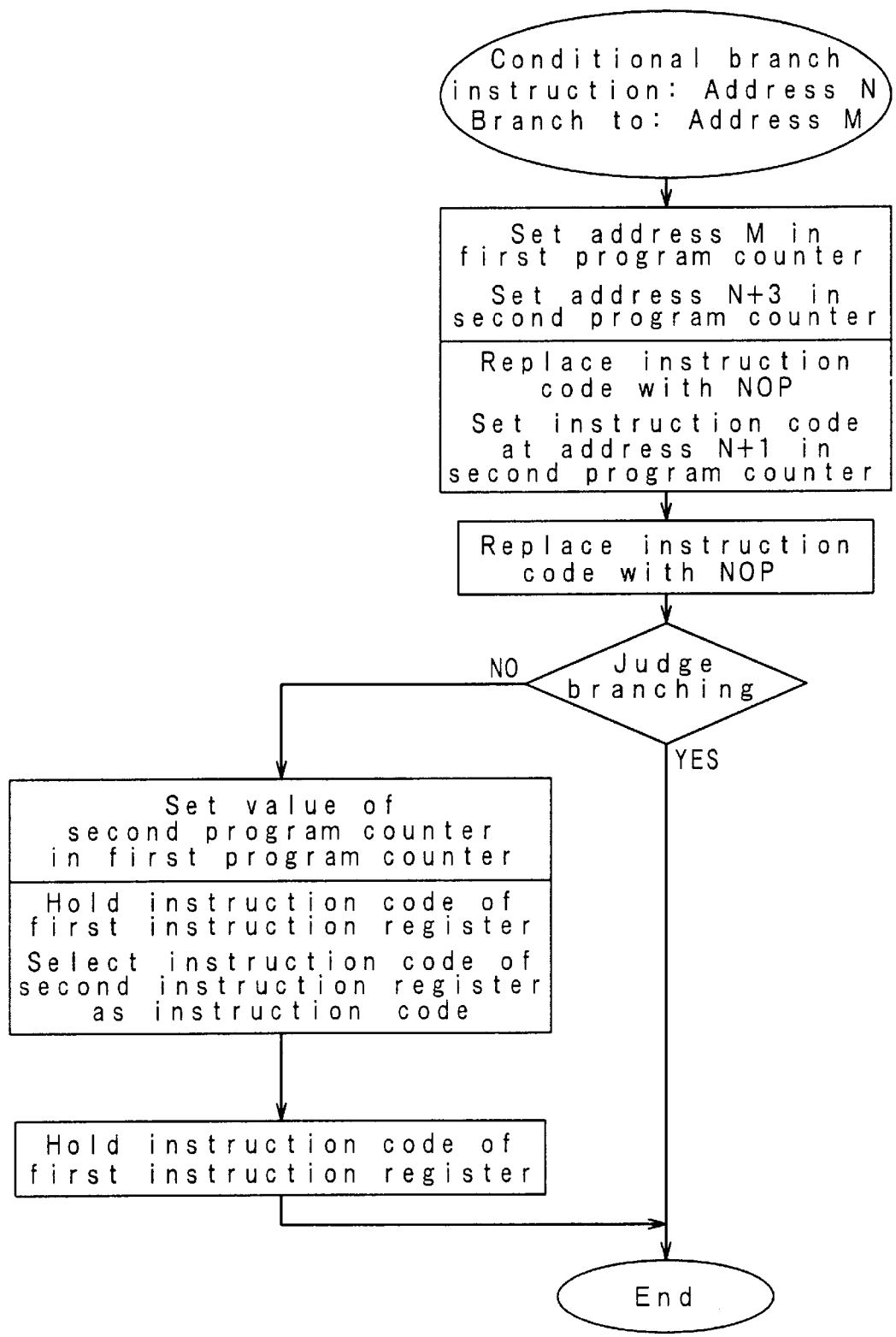
FIG. 13 is a flow chart which shows a flow of control of conditional branching in a five-stage pipeline which includes two stages for fetching instructions according to the third preferred embodiment of the present invention.
Figure 14:
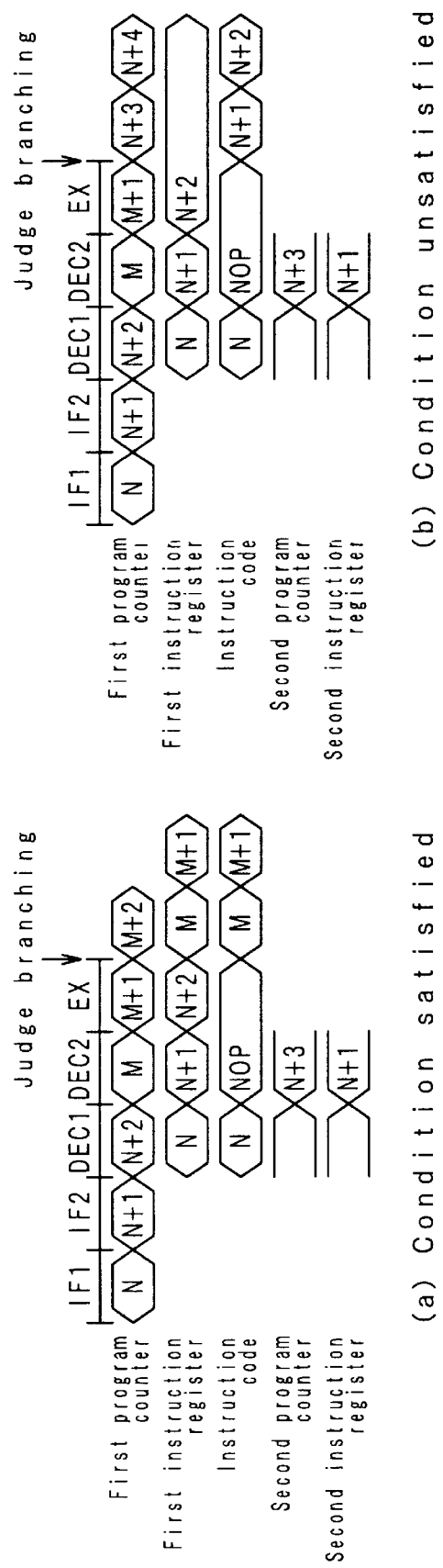
FIG. 14 is a timing chart which shows timing of conditional branching in a five-stage pipeline which includes two stages for fetching instructions according to the third preferred embodiment of the present invention.

FIG. 13 shows a control flow of execution of a conditional branch instruction for a five-stage pipeline (of a first instruction fetch stage IF1, a second instruction fetch stage IF2, a first instruction decode stage DEC1, a second instruction decode stage DEC2 and an instruction execution stage EX) which includes two stages for fetching instructions. In this case, an address of a conditional branch instruction is an address N, and an address of an instruction beyond a branch is an address M. FIG. 14 is a corresponding timing chart. The section (a) corresponds to a case where a condition is met, while the section (b) corresponds to a case where a condition is not met. In the following, an operation at each stage of a pipeline will be described. The first instruction fetch stage, the second instruction fetch stage and the first instruction decode stage will not be described.

(1) Second Instruction Decode Stage for Conditional Branch Instruction

The branch judging element 4 decodes the second instruction code 13. Judging that the second instruction code 13 is a conditional branch instruction, the branch judging element 4 outputs the branch signal 14 and the branch address 15.

In accordance with the second program counter branch signal 112, an address (N+3) of an instruction three instructions after the conditional branch instruction is set to the second program counter 104. This saves the address (N+3) of the instruction three instructions after the conditional branch instruction.

The address selector 103 selects the branch address 15 in accordance with the address selector branch signal 111, whereby the address 15 is set to the first program counter 101 and the address 11 becomes the address M. As a result, before a time point that a branch judgment is made (which is the end of the execution stage for executing the conditional branch instruction), an instruction beyond a branch is fed to the pipeline in advance.

In accordance with the second instruction register branch signal 313, an instruction code (N+1) of an instruction one instruction after the conditional branch instruction is set to the second instruction register 303. This saves the instruction code (N+1) of the instruction one instruction after the conditional branch instruction.

The instruction selector 302 selects the NOP code (i.e., No Operation code) 315 in accordance with the instruction selector branch signal 312, whereby the second instruction code 13 becomes an NOP instruction.

(2) Execution Stage for Conditional Branch Instruction

The instruction selector 302 selects the NOP code (i.e., No Operation code) 315 in accordance with the instruction selector branch signal 312, whereby the second instruction code 13 becomes an NOP instruction.

Where Condition Is Met:

(3) Next Stage Following Execution Stage for Conditional Branch Instruction

The branch signal 14 is freed and the apparatus returns to the normal operations, so that the second instruction code 13 becomes an instruction at the address M.

As a result, the instruction at the address M and the following instructions are executed in sequence after the conditional branch instruction which is located at the addresses N, although the with two cycles of branch hazards interposed.

Where Condition Is Not Met:

(3) Next Stage Following Execution Stage for Conditional Branch Instruction

The address selector 103 selects the second program counter outputs 115 in accordance with the address selector branch signal 111, whereby the value registered in the second program counter 104 is set to the first program counter 101 and the address 11 becomes the address N+3. As a result, the saved address of the subsequent instruction is returned to the pipeline.

The first instruction register 301 holds the instruction at the address N+2 in accordance with the first instruction register branch signal 311, so that the second instruction code 13 becomes the instruction at the address N+2.

The instruction selector 302 selects the second instruction register output 316 in accordance with the instruction selector branch signal 312, whereby the second instruction code 13 becomes an instruction at the address N+1. As a result, the saved instruction code of the subsequent instruction is returned to the pipeline.

(4) Second Next Stage Following Execution Stage for Conditional Branch Instruction The first instruction register 301 holds the instruction at the address N+2 in accordance with the first instruction register branch signal 311, so that the second instruction code 13 becomes the instruction at the address N+2.

As a result, the instruction at the address N+1 and the following instructions are executed in sequence after the conditional branch instruction which is located at the address N, although with two cycles of branch hazards interposed.

The program control method described above which is shown in FIGS. 1, 2, 5, 11, 12, 13 and 14 is summarized as follows. That is, an instruction code at the address 11, which is outputted from the program counter portion 1, is retrieved from the memory 2 to the instruction register portion 3 and a corresponding instruction is executed. Therefore, when conditional branching for pipelining the instruction is to be controlled, before a condition of a conditional branch instruction becomes defined, the program counter portion 1 saves an address of an instruction three instructions after the conditional branch instruction, the branch address 15 is set to the program counter portion 1, the instruction register portion 3 saves an instruction code of an instruction one instruction after the conditional branch instruction, and the instruction register portion 3 replaces the instruction code with an NOP instruction code. When the condition is met, the instruction is executed as it directly is. When the condition is not met, the saved address of the instruction three instructions after the conditional branch instruction is set to the program counter portion 1, the instruction register portion 3 replaces the instruction code with the saved instruction code of the instruction one instruction after the conditional branch instruction, the first instruction register 301 then holds an instruction code of an instruction two instructions after the conditional branch instruction, and the instruction is executed. In the case which is shown in FIGS. 13 and 14, there are two steps for replacing an instruction code with an NOP instruction code.

Meanwhile, the program control apparatus described above which is shown in FIGS. 1, 2, 5, 11, 12, 13 and 14 has the following structure. That is, aiming at controlling conditional branching for pipelining an instruction, the apparatus comprises the program counter portion 1 which receives the branch address 15 and the branch signal 14 to generate the address 11, the memory 2 which stores or outputs the first instruction code 12 in accordance with the address 11, the instruction register portion 3 which receives the first instruction code 12 and the branch signal 14 and outputs the second instruction code 13, and the branch judging element 4 which decodes the second instruction code 13, decides a branch and outputs the branch signal 14 and the branch address 15.

In this case, the program counter portion 1 is formed by the first and the second program counters 101 and 104, the address selector 103, and the address adder 102. The first program counter 101 receives the address selector output 113 and outputs the address 11. The address selector 103 receives the branch address 15, the address adder output 114 and the second program counter output 115, and selects and outputs one of the branch address 15, the address adder output 114 and the second program counter output 115 in response to the branch signal 14. The address adder 102 increments the address 11. The second program counter 104 receives the address adder output 114, and holds the address adder output 114 in response to the branch signal 14.

On the other hand, the instruction register portion 3 is formed by the first and the second instruction registers 301, 303 and the instruction selector 302. The first instruction register 301 receives the first instruction code 12, and holds the first instruction code 12 in response to the branch signal 14. The second instruction register 303 receives the first instruction code 12, and holds the first instruction cod 12 in response to the branch signal 14. The instruction selector 302 receives the first instruction register output 314, the second instruction register output 316 and the NOP code 315, and selects either one of the first instruction register output 314, the second instruction register output 316 and the NOP code 315 and outputs the first instruction register output 314, the second instruction register output 316 or the NOP code 315 as the second instruction code 13 in response to the branch signal 14.

In this structure, before a condition of a conditional branch instruction becomes defined, an address of an instruction three instructions after the conditional branch instruction is saved in the second program counter 104, the branch address 15 is set to the program counter 101, an instruction code of an instruction one instruction after the conditional branch instruction is saved to the second instruction register 303, and the instruction selector 302 selects the NOP code 315. When the condition is met, an instruction is executed as it directly is. When the condition is not met, the address saved in the second program counter 104 is set to the program counter 101, the instruction selector 302 selects the second instruction register 303, the first instruction register 301 holds an instruction code of an instruction two instructions after the conditional branch instruction and the instruction is executed under control, so that branch hazards are reduced two cycles which are created when the condition of the conditional branch instruction is met in a structure in which there are two stages for fetching instructions.

As described above, according to the third preferred embodiment, since the branch address 15 is set to the first program counter 101 and consequently fed to a pipeline in advance before a condition of the conditional branch instruction becomes defined, by the time the condition is met, the first stage, i.e., the instruction fetch stage of pipeline processing of an instruction beyond the branch is already complete. After the condition is met, the pipeline processing of the beyond-the-branch instruction is continued starting at the second stage, namely the instruction decode stage, and therefore, branch hazards associated with execution of the beyond-the-branch instruction are reduced compared with where the beyond-the-branch instruction is fed to the pipeline after the condition of the conditional branch instruction becomes defined.

Meanwhile, an address of a subsequent instruction which is subsequent to the conditional branch instruction is stored in the second program counter 104 before the condition of the conditional branch instruction becomes defined and the first instruction register output 314 is stored in the second instruction register 303, so that the instruction code of the subsequent instruction which is subsequent to the conditional branch instruction is saved. Hence, when the condition is not met, the saved address of the subsequent instruction which is subsequent to the conditional branch instruction is set to the first program counter 101 and consequently returned to the pipeline, while the instruction code is outputted from the second instruction register 303 and consequently returned to the pipeline, and therefore, the subsequent instruction which is subsequent to the conditional branch instruction is executed without increasing branch hazards. It then follows that as a whole, it is possible to reduce branch hazards which are created when the condition is met without increasing branch hazards which are created when then condition is not met, execute a program efficiently, and shorten a processing time.

Further, since the foregoing requires simply to save the address and the instruction code of the subsequent instruction which is subsequent to the conditional branch instruction and feed the branch address 15 to the pipeline in advance before the condition of the conditional branch instruction becomes defined, it is possible to effectively reduce branch hazards without restricting the structure of the pipeline, the contents of instructions, etc.

In the case of a four-stage pipeline, the contents of instructions, etc.

In the case of a four-stage pipeline which includes two stages for fetching instructions, in particular, it is possible to reduce branch hazards one cycle which are created when the condition is met. In addition, in the case of a five-stage pipeline which includes two stages for fetching instructions, it is possible to reduce branch hazards two cycles which are created when the condition is met.

Although the foregoing has described that there are two stages for fetching instructions, it is clearly understood that a structure with an optional number of fetch stages more than two ensures the same effect if instruction registers are additionally disposed in accordance with the number of the fetch stages. While the description above is related to where there is one instruction decode stage and where there are two instruction decode stages, the same effect is nevertheless obtained even where there are three or more instruction decode stages. Where there are three or more instruction fetch stages, in particular, if three or more instruction decode stages are disposed, it is possible to reduce branch hazards three or more cycles which are created when the condition is met.

Fourth Preferred Embodiment

In the following, a program control method and a program control apparatus for conditional branch processing according to a fourth preferred embodiment of the present invention will be described with reference to the drawings.

Figure 6:
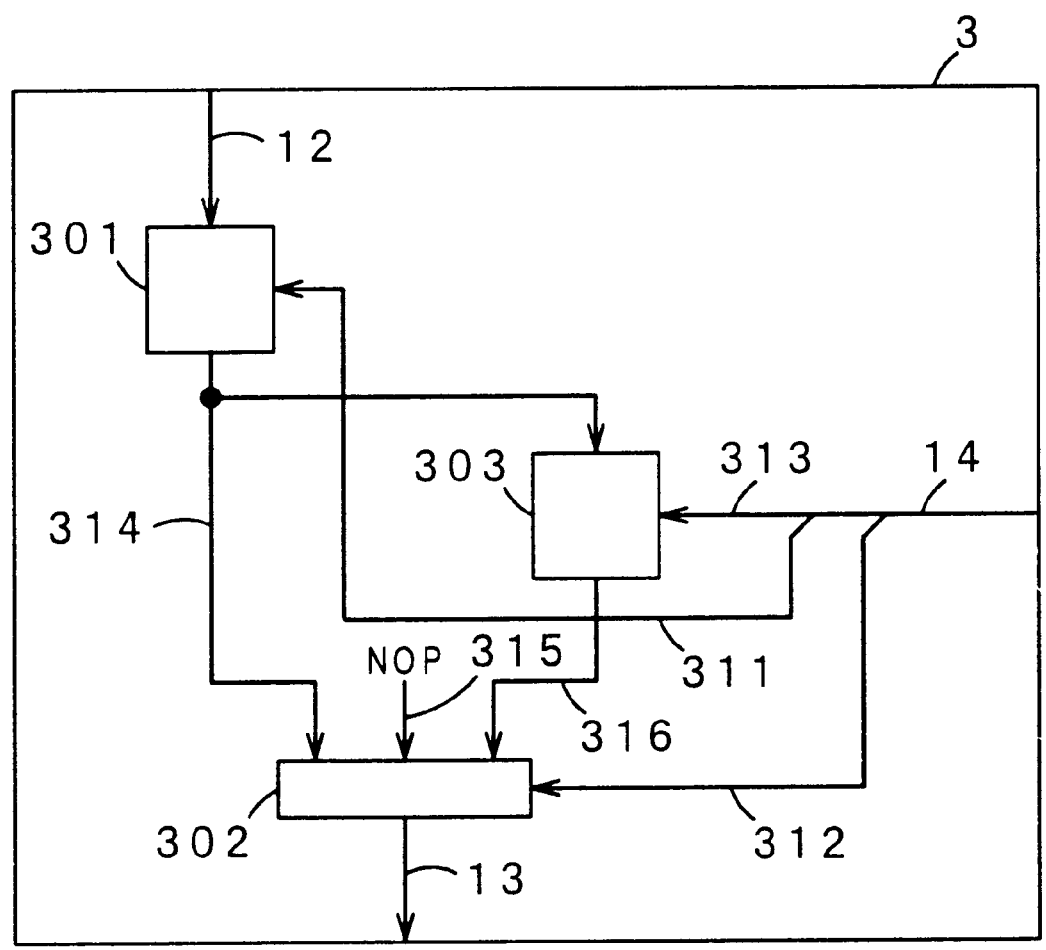
FIG. 6 is a block diagram showing a specific structure of an instruction register portion according to the fourth preferred embodiment of the present invention.

FIG. 6 is a block diagram showing a structure of the instruction register portion 3 according to the fourth preferred embodiment of the present invention. A difference from FIG. 5 is that an input to the second instruction register 303 which serves as the second instruction holding means is changed to the first instruction register output 314 from the first instruction code 12. In FIG. 6, elements which have the same function as those of the elements which are shown in FIG. 5 will be denoted at the same reference symbols as those used in FIG. 5, and a detailed description on those elements will be simply omitted.

According to the fourth preferred embodiment, the structure of the program counter portion 1 in the basic structure which is shown in FIG. 1 is as shown in FIG. 3, and the structure of the instruction register portion 3 is as shown in FIG. 6. The branch signal 14 is formed by the address selector branch signal 111, the second program counter branch signal 112, the first instruction register branch signal 311, the instruction selector branch signal 312 and the second instruction register branch signal 313.

Now, operations of the program control apparatus which has such a structure above will be described with reference to FIGS. 15 and 16.

Figure 15:
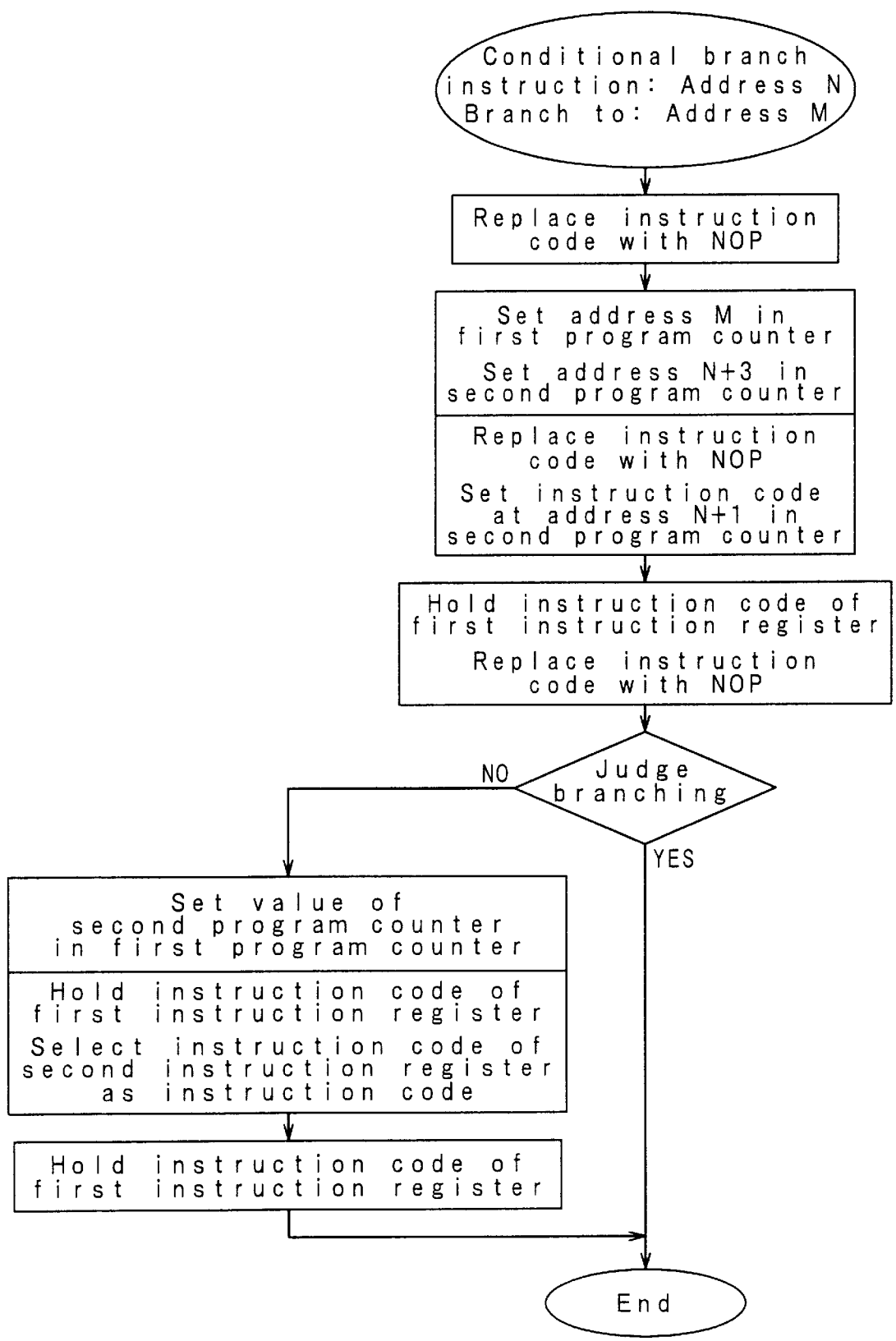
FIG. 15 is a flowchart which shows a flow of control of conditional branching in a six-stage pipeline which includes two stages for fetching instructions according to the fourth preferred embodiment of the present invention.
Figure 16:
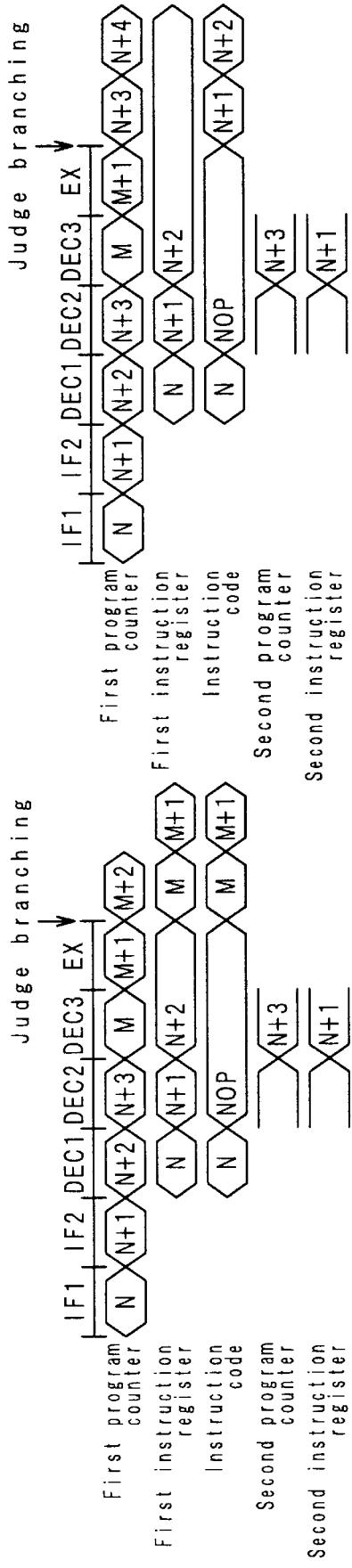
FIG. 16 is a timing chart which shows timing of conditional branching in a six-stage pipeline which includes two stages for fetching instructions according to the fourth preferred embodiment of the present invention.

FIG. 15 shows a control flow of execution of a conditional branch instruction for a six-stage pipeline (of a first instruction fetch stage IF1, a second instruction fetch stage IF2, a first instruction decode stage DEC1, a second instruction decode stage DEC2, a third instruction decode stage DEC3 and an instruction execution stage EX) which includes two stages for fetching instructions. In this case, an address of a conditional branch instruction is an address N, and an address of an instruction beyond a branch is an address M. FIG. 16 is a corresponding timing chart. In the following, an operation at each stage of a pipeline will be described. The first instruction fetch stage, the second instruction fetch stage and the first instruction decode stage will not be described.

(1) Second Instruction Decode Stage for Conditional Branch Instruction

The branch judging element 4 decodes the second instruction code 13. Judging that the second instruction code 13 is a conditional branch instruction, the branch judging element 4 outputs the branch signal 14 and the branch address 15.

The instruction selector 302 selects the NOP code (i.e., No Operation code) 315 in accordance with the instruction selector branch signal 312, whereby the second instruction code 13 becomes an NOP instruction.

(2) Third Instruction Decode Stage for Conditional Branch Instruction

In accordance with the second program counter branch signal 112, an address (N+3) of an instruction three instructions after the conditional branch instruction is set to the second program counter 104. This saves the address (N+3) of the instruction three instructions after the conditional branch instruction.

The address selector 103 selects the branch address 15 in accordance with the address selector branch signal 111, whereby the address 15 is set to the first program counter 101 and the address 11 becomes the address M. As a result, before a time point that a branch judgment is made (which is the end of the execution stage for executing the conditional branch instruction), an instruction beyond a branch is fed to the pipeline in advance.

In accordance with the second instruction register branch signal 313, an instruction code (N+1) of an instruction one instruction after the conditional branch instruction is set to the second instruction register 303. This saves the instruction code (N+1) of the instruction one instruction after the conditional branch instruction.

The instruction selector 302 selects the NOP code (i.e., No Operation code) 315 in accordance with the instruction selector branch signal 312, whereby the second instruction code 13 becomes an NOP instruction.

(3) Execution Stage for Condition Branch Instruction

The instruction selector 302 selects the NOP code (i.e., No Operation code) 315 in accordance with the instruction selector branch signal 312, whereby the second instruction code 13 becomes an NOP instruction.

Where Condition Is Met:

(4) Next Stage Following Execution Stage for Conditional Branch Instruction

The branch signal 14 is freed and the apparatus returns to the normal operations, so that the second instruction code 13 becomes an instruction at the address M.

As a result, the instruction at the address M and the following instructions are executed in sequence after the conditional branch instruction which is located at the address N, although with three cycles of branch hazards interposed.

Where Condition Is Not Met:

(4) Next Stage Following Execution Stage for Conditional Branch Instruction

The address selector 103 selects the second program counter output 115 in accordance with the address selector branch signal 111, whereby the value registered in the second program counter 104 is set to the first program counter 101 and the address 11 becomes the address N+3. As a result, the saved address of the subsequent instruction is returned to the pipeline. The first instruction register 301 holds the instruction at the address N+2 in accordance with the first instruction register branch signal 311.

The instruction selector 302 selects the second instruction register output 316 in accordance with the instruction selector branch signal 312, whereby the second instruction code 13 becomes an instruction at the address N+1. As a result, the saved instruction code of the subsequent instruction is returned to the pipeline.

(5) Second Next Stage Following Execution Stage for Conditional Branch Instruction The first instruction register 301 holds the instruction at the address N+2 in accordance with the first instruction register branch signal 311, so that the second instruction code 13 becomes the instruction at the address N+2.

As a result, the instruction at the address N+1 and the following instructions are executed in sequence after the conditional branch instruction which is located at the address N, although with three cycles of branch hazards interposed.

The program control method described above which is shown in FIGS. 1, 2, 5, 11, 12, 15 and 16 is summarized as follows. That is, an instruction code at the address 11, which is outputted from the program counter portion 1, is retrieved from the memory 2 to the instruction register portion 3 and a corresponding instruction is executed. Therefore, when conditional branching for pipelining the instruction is to be controlled, before a condition of a conditional branch instruction becomes defined, the instruction register portion 3 replaces the instruction code with an NOP instruction code, the program counter portion 1 then saves an address of an instruction three instructions after the conditional branch instruction, the branch address 15 is set to the program counter portion 1, the instruction register portion 3 saves an instruction code of an instruction one instruction after the conditional branch instruction, the instruction register portion 3 replaces the instruction code with an NOP instruction code, the instruction register portion 3 holds an instruction two instructions after the conditional branch instruction, and the instruction register portion 3 replaces the instruction code with an NOP instruction code. When the condition is met, the instruction is executed as it directly is. When the condition is not met, the saved address of the instruction three instructions after the conditional branch instruction is set to the program counter portion 1, the instruction register portion 3 replaces the instruction code with the saved instruction code of the instruction one instruction after the conditional branch instruction, the instruction register portion 3 then holds the instruction code of an instruction two instructions after the conditional branch instruction, and the instruction is executed.

Meanwhile, the program control apparatus described above which is shown in FIGS. 1, 2, 5, 11, 12, 15 and 16 has the following structure. That is, aiming at controlling conditional branching for pipelining an instruction, the apparatus comprises the program counter portion 1 which receives the branch address 15 and the branch signal 14 to generate the address 11, the memory 2 which stores or outputs the first instruction code 12 in accordance with the address 11, the instruction register portion 3 which receives the first instruction code 12 and the branch signal 14 and outputs the second instruction code 13, and the branch judging element 4 which decodes the second instruction cod 13, decides a branch and outputs the branch signal 14 and the branch address 15.

In this case, the program counter portion 1 is formed by the first and the second program counters 101 and 104, the address selector 103, and the address adder 102. The first program counter 101 receives the address selector output 113 and outputs the address 11. The address selector 103 receives the branch address 15, the address adder output 114 and the second program counter output 115, and a selects and outputs one of the branch address 15, the address adder output 114 and the second program counter output 115 in response to the branch signal 14. The address adder 102 increments the address 11. The second program counter 104 receives the address 11, and holds the address 11 in response to the branch signal 14.

On the other hand, the instruction register portion 3 is formed by the first and the second instruction registers 301, 303 and the instruction selector 302. The first instruction register 301 receives the first instruction code 12, and holds the first instruction code 12 in response to the branch signal 14. The second instruction register 303 receives the first instruction register output 314, and holds the first instruction register output 314 in response to the branch signal 14. The instruction selector 302 receives the first instruction register output 314, the second instruction register output 316 and the NOP code 315, and selects either one of the first instruction register output 314, the second instruction register output 316 and the NOP code 315 and outputs the first instruction register output 314, the second instruction register output 316 or the NOP code 315 as the second instruction code 13 in response to the branch signal 14.

In this structure, before a condition of a conditional branch instruction becomes defined, the instruction selector 302 selects the NOP instruction code 315, an address of an instruction three instructions after the conditional branch instruction is saved in the second program counter 104, the branch address 15 is set to the program counter 101, an instruction code of an instruction one instruction after the conditional branch instruction is saved to the second instruction register 303, and the instruction selector 302 selects the NOP code 315. When the condition is met, an instruction is executed as it directly is. When the condition is not met, the address saved in the second program counter 104 is set to the program counter 101, the instruction selector 302 selects the second instruction register 303, the first instruction register 301 holds an instruction code of an instruction two instructions after the conditional branch instruction and the instruction is executed under control, so that branch hazards are reduced two cycles which are created when the condition of the conditional branch instruction is met in a structure in which there are two stages for fetching instructions.

As described above, according to the fourth preferred embodiment, as in the third preferred embodiment described earlier, in the case of a six-stage pipeline which includes two stages for fetching instructions, it is possible to reduce branch hazards two cycles which are created when the condition is met. Further, it is possible to provide one more stage for a branch judgment than in the third preferred embodiment.

Although described immediately above is related to where there are two stages for fetching instructions, it is clearly understood that a structure with an optional number of fetch stages more than two ensures the same effect if instruction registers are additionally disposed in accordance with the number of the fetch stages. A similar effect is obtained even where there are four or more instruction decode stages.

In addition, a six-stage pipeline can be realized with the third preferred embodiment as well, if the structure described immediately above is modified in such a manner that the address (N+3) three instructions after the conditional branch instruction is set to the second program counter 104 at the second instruction decode stage the instruction code (N+1) of the instruction one instruction after the conditional branch instruction is set to the second instruction register 303 at the second instruction decode stage. More precisely, a difference from the third preferred embodiment lies in the timing of saving the subsequent instruction subsequent to the conditional branch instruction. This difference is as already described in relation to the second preferred embodiment.

What is claimed is:

1. A program control method of controlling conditional branching in an information processing apparatus which processes an instruction by pipeline processing without using a branch predictor, said method comprising:

storing, outside a pipeline, pipeline information of an original pipeline instruction, prior to a condition of a conditional branch instruction being determined, said pipeline information of said original pipeline instruction being subsequent to said conditional branch instruction in said pipeline, said pipeline information of said original pipeline instruction being stored outside said pipeline independently of a determination of said condition of said conditional branch instruction, so that a first branch instruction of a branch identified by said conditional branch instruction is fed to said pipeline in advance of the determination of said condition of said conditional branch, so as to replace said original pipeline instruction with said first branch instruction in said pipeline, wherein:

when the condition of said conditional branch is met, said first branch instruction is executed by said information processing apparatus, and when the condition of said conditional branch is not met, said original pipeline instruction is returned to said pipeline and executed.

2. The program control method of claim 1, wherein said pipeline information of said original pipeline instruction is formed by a subsequent address.

3. A conditional branch control method, wherein for pipeline processing of an instruction within an information processing apparatus, said instruction is decoded, and if said instruction is a conditional branch instruction, then before a condition for said conditional branch instruction becomes definite, an address of a subsequent instruction, which is subsequent to said conditional branch instruction, and an instruction code of said subsequent instruction are saved as pipeline information regarding said subsequent instruction, and an instruction of a branch destination is fed to a pipeline as precedence, and said instruction of said branch destination is executed when said condition is met, but said address and said instruction code of said subsequent instruction which are saved are returned to said pipeline and said subsequent instruction is executed when said condition is not met.

* * * * *